United States Patent
Hehl

[11] 3,841,823
[45] Oct. 15, 1974

[54] DIE CARRIER GUIDING DEVICE FOR INJECTION MOLDING MACHINE

[76] Inventor: Karl Hehl, 7291 Lossburg, Wuerttemberg, Germany

[22] Filed: July 26, 1972

[21] Appl. No.: 275,136

[30] Foreign Application Priority Data
July 26, 1971 Germany............................ 2137284

[52] U.S. Cl.............................. 425/450.1, 425/107
[51] Int. Cl................................................ B29f 1/00
[58] Field of Search..................... 425/450, 107, 242; 308/3 A, 3 R, 5 R, 6 R; 105/178; 104/33; 295/36 R, 43, 44

[56] References Cited
UNITED STATES PATENTS

| | | | |
|---|---|---|---|
| 425,932 | 4/1890 | Cooke............................. | 308/174 |
| 2,056,100 | 9/1936 | Hahn et al........................ | 105/178 |
| 3,015,527 | 1/1962 | Schmidt........................... | 308/6 R |
| 3,346,924 | 10/1967 | Lombard.......................... | 425/242 |
| 3,674,400 | 7/1972 | Sauerbruch et al............... | 425/242 |

Primary Examiner—J. Spencer Overholser
Assistant Examiner—David S. Safran
Attorney, Agent, or Firm—Joseph A. Geiger

[57] ABSTRACT

A die carrier guiding device for injection molding machine whose movable die carrier is independently guided on a rigid cantilever-type guide frame by means of axially adjustable flanged guide rollers engaging spaced guide profiles on horizontal and vertical guide surfaces.

9 Claims, 4 Drawing Figures

DIE CARRIER GUIDING DEVICE FOR INJECTION MOLDING MACHINE

BACKGROUND OF THE INVENTION

1. Field of the Invention

The invention relates to injection molding machines, and in particular to injection molding machines which include a stationary die half on a stationary die carrier which is mounted on a central machine frame and a movable die half on a movable die carrier, where the movable die half is supported on either the machine frame or on a support frame mounted on the machine frame and connected to the forward end of die-actuating rods which provide the closing movement of the injection molding die.

2. Description of the Prior Art

The prior art in this field includes known injection molding machines in which the movable die carrier is supported on the machine frame (e.g., Japanese Published Application No. 9087/1961). With this kind of injection molding machine it is sometimes difficult to ascertain the alignment of the two die halves with sufficient accuracy and reliability. It may also happen under certain circumstances that the actuating rods which carry the movable die carrier and which are guided only on their rear portions develop lateral deflections or a swinging motion, thereby exerting very heavy pressures on the guide surfaces of the piston rods during the closing motion. These guide pressures are particularly severe when the piston rods of the hydraulic die-actuating cylinders are the only supporting elements for the movable die carrier, so that the piston rods have to provide the guidance as well as the closing pressure. Obviously, the susceptibility of these piston rods to deviations from accurate alignment increases with increasing die strokes and consequently longer piston rods. A suggestion to independently support at least the weight of the movable die carrier is disclosed in applicant's copending application Ser. No. 233,472. This solution involves the mounting of horizontally extending carrier arms on the machine frame and the addition of a simple roller support on the bottom of the movable die carrier engaging an upper flat surface of the support arms.

SUMMARY OF THE INVENTION

It is a primary object of the present invention to suggest an injection molding machine of the earlier mentioned type which does not have the above-mentioned shortcomings and which requires a minimum of additional components in order to assure economy of production and ease of assembly and adjustment.

The invention proposes to attain the above objective by suggesting an injection molding machine which includes two parallel guide arms as part of a rigid guide frame, the movable die carrier being provided with flanged guide rollers which engage the arms of the carrier frame vertically and laterally so as to provide accurate guidance in two planes. In a preferred embodiment of the invention, the flanged guide rollers include axial thrust bearings and individual axial adjustment means for accurate alignment and clearance-free operation.

BRIEF DESCRIPTION OF THE DRAWINGS

Further special features and advantages of the invention will become apparent from the description following below, when taken together with the accompanying drawings which illustrate, by way of example, several embodiments of the invention, representing the various figures as follows.

DESCRIPTION OF THE PREFERRED EMBODIMENT

Figure 1:
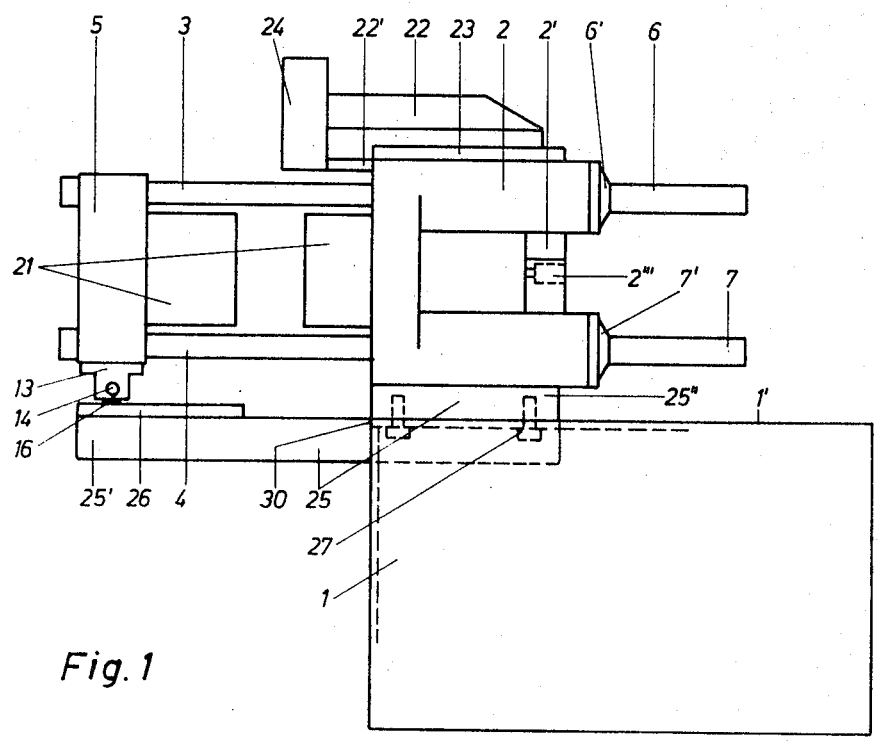
FIG. 1 shows in elevation an injection molding machine representing a first embodiment of the invention.
Figure 2:
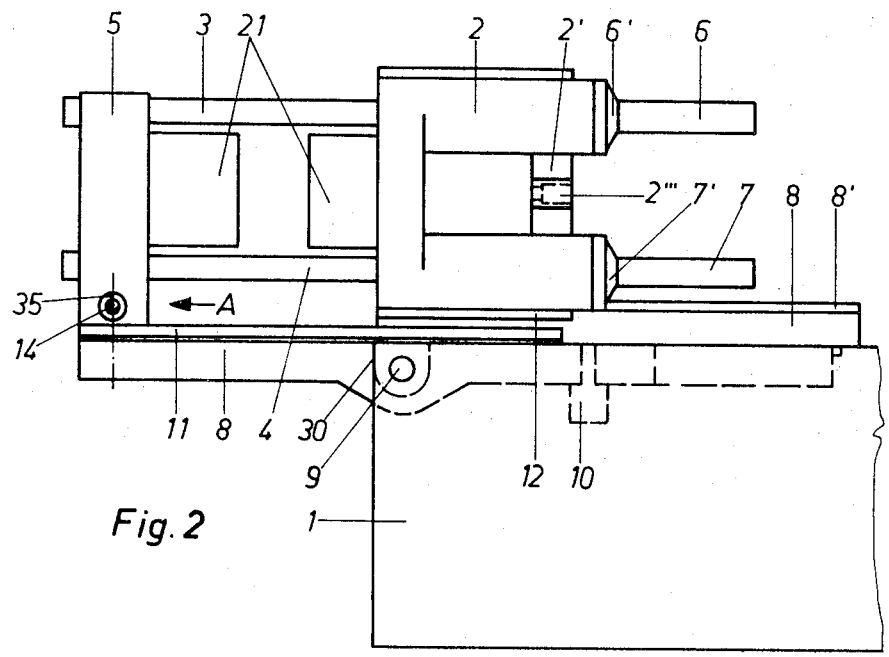
FIG. 2 shows likewise in elevation a modified injection molding machine representing a second embodiment of the invention.

As can be seen in FIGS. 1 and 2, the injection molding machine includes a die-actuating unit mounted on a machine frame 1. The split injection molding die 21 includes a movable die half which is carried by a movable die carrier 5 and a stationary die half which is carried by a stationary die carrier or cylinder mount 2 forming a structural unit which is mountable on the machine frame 1 in various positions. The cylinder mount 2 also includes connecting sockets 2''' for the attachment of an injection unit (not shown) which is aligned perpendicularly to the separation plane of the molding die. The connecting sockets 2''' are arranged in transverse struts 2' of the cylinder mount 2. In this case the plastification cylinder of the injection unit reaches through a central opening of the cylinder mount 2 into the stationary die half. FIG. 1 shows an additional support for an injection unit operating in alignment with the die separation plane which is mounted on top of the cylinder mount 2 by means of an adjustable carriage assembly 22, 23, 24. Carriage 22 has two lateral guide profiles 22' which cooperate with fixed guides 23 on the cylinder mount 2. On its forward end it has connecting sockets 24 for an injection unit (not shown) operating in alignment with the separation plane of the die halves.

The hydraulic pressure cylinders in the cylinder mount 2 have horizontally extending piston rods 3 and 4 whose forward ends are rigidly connected to the movable die carrier 5. The opening and closing motions are produced by smaller hydraulic cylinders 6 and 7 which are coaxially connected to the main cylinders by means of connecting flanges 6' and 7'. The stationary die half is mounted on the forward vertical face of cylinder mount 2. The movable die half is similarly mounted on the rearward vertical face of the movable die carrier 5. The embodiment of FIG. 1 further shows a rigid guide frame 25 which is mounted intermediate the cylinder mount 2 and the machine frame 1. The embodiment of FIG. 2 shows a differently mounted guide frame 8 between the cylinder mount 2 and the machine frame 1.

As can be seen from FIGS. 1 and 2, the forward face of cylinder mount 2 is vertically aligned with the forward face of the block-shaped machine frame 1. Thus, the movable die carrier 5 is always in an overhang position relative to machine frame 1. The guide frame 25 or 8, respectively, therefore acts as a cantilever support for the movable die carrier 5. The latter engages two spaced guide profiles 11 on the guide frame by means of flanged guide rollers 16 (FIGS. 3 and 4).

Figure 3:
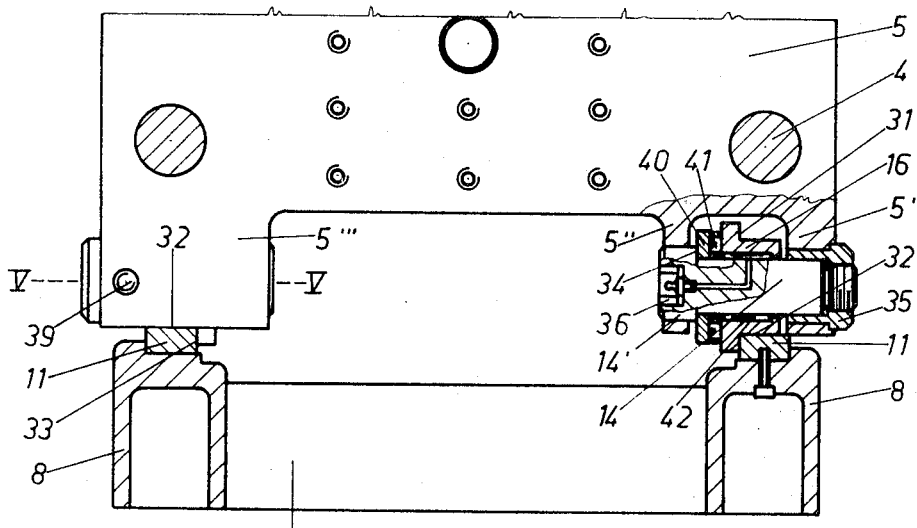
FIG. 3 shows in an enlarged side view from direction A, and in partial cross section, several details of the die carrier guide according to either of the embodiments of FIGS. 1 and 2.
Figure 4:
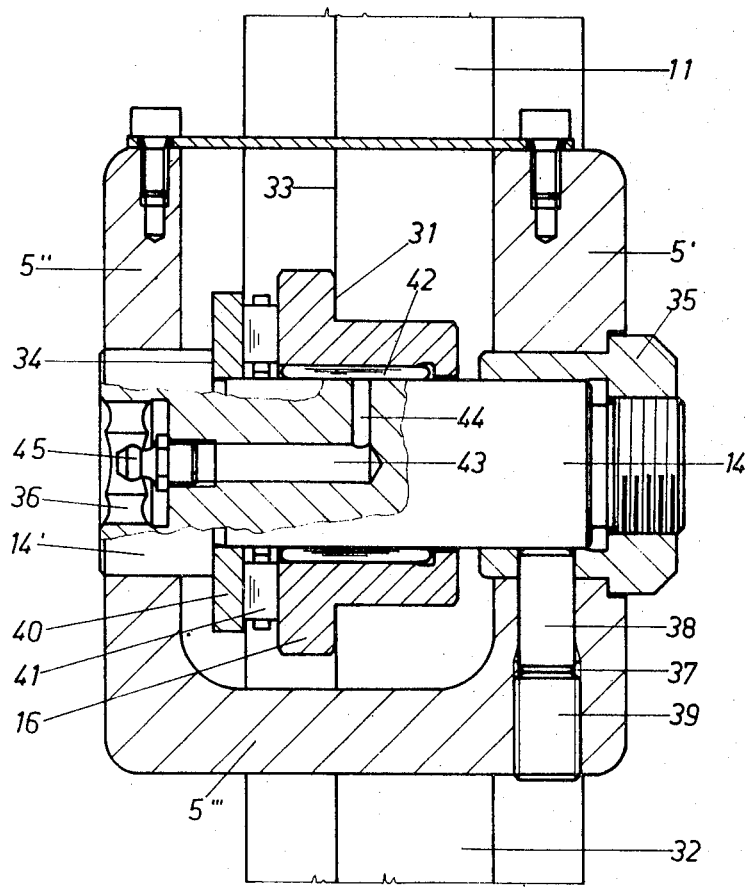
FIG. 4 shows in a further enlarged cross section along line V—V of FIG. 3, additional details of the novel guide elements.

FIGS. 3 and 4 illustrate in detail the guidance of the movable die carrier 5 relative to the rigid guide frame 25 or 8. The guide rollers 16, in order to provide both vertical and lateral support, include a cylindrical portion and a lateral guide flange 31 on their inner side. With the shoulder surface of their guide flanges these rollers engage vertical guide faces 33 of the two spaced guide profiles 11, while rolling on the horizontal support faces 32 of the same profiles. The guide profiles 11 are preferably precision-ground rectangular profiles which are mounted in precise parallel alignment on the rigid guide frame 25 or 8. The two embodiments shown feature the guide flanges 31 of the rollers running on the inner guide faces of the guide profiles 11, but it should be understood that they could equally well be arranged to run on corresponding outer guide faces of similar guide profiles.

The flanged guide rollers 16 are rotatably supported on independent bearing pins 14 which are mounted in downwardly extending brackets 5', 5'' on the lower end of the movable die carrier 5. The two non-rotating bearing pins 14 are axially adjustable so as to permit elimination of any clearance between the roller shoulders 31 and the vertical guide faces 33 of the guide profiles 11. Each bearing pin 14 has on one end an enlarged-diameter portion 14' which forms a bearing shoulder 34 against axial roller thrust. The axial position of shoulder 34 is adjustable relative to the corresponding fixed guide profile 11 so as to produce a certain guide pressure between the shoulder 31 of the flanged roller 16 and the vertical guide face 33 of guide profile 11. This adjustment is obtained by means of a threaded positioning nut 35 which engages a matching threaded end portion of the bearing pin 14 opposite its enlarged-diameter portion 14'. The positioning nut 35 is axially retained by means of a shoulder and a radial clamping plug 38 with set screw 39 which passes through a radial bore in the positioning nut 35 so as to retain bearing pin 14 against rotation. The bearing pin 14 further includes on the inside of its enlarged-diameter portion 14' a hexagonal recess 36 for engagement by an appropriate adjustment tool. Rotation of the bearing pin 14 and subsequent tightening of the clamping plug 38 assure an accurate and rigid positioning of the flanged roller 16 relative to the guide profile 11.

Between roller 16 and bearing pin 14 is further arranged a thrust ring 40 and a thrust roller bearing 41 as well as a needle bearing 42. Any lateral guide forces originating between the flanged roller 16 and the guide profile 11 are thus transferred via the thrust bearing 41 onto the bearing pin 14 and from there via the positioning nut 35 into the arm 5' of the support bracket of the movable die carrier 5. Any vertical guide forces created between the cylindrical portion of the flanged roller 16 and the upper guide face of guide profile 11 are supported by the needle bearing 42. The bearing pin 14 further includes a centrally arranged lubricating channel 43, 44 connecting the needle bearing 42 to a grease nipple 45 arranged at the inside of the hexagonal recess 36. The supporting brackets 5', 5'', 5''' surround the flanged roller 16 and bearing pin 14 on three sides. A removable cover on the fourth side provides lateral access to the roller and bearings.

While the guide frame 25 of the embodiment of FIG. 1 extends horizontally, being rigidly mounted to the upper face of machine frame 1, it could also be mounted vertically on the forward face of frame 1. In contrast thereto, the guide frame 8 of the embodiment of FIG. 2 provides the additional feature of a pivot 9 around which the guide frame and the entire die-actuating unit can be pivoted between a horizontal position as shown and a vertical operating position.

It should be understood that the advantages of the invention are also present when the movable die carrier is engaged by elements other than the piston rods 3 and 4 of the hydraulic cylinders to obtain the opening and closing motions. The invention should not be seen as being limited to a structure in which the movable die carrier 5 is arranged in an overhang position relative to the machine frame 1. The invention can therefore be advantageously adapted to other injection molding machines where the die-actuating rods or other elements which are attached to the movable die carrier are not separately supported and guided on their forward ends.

The embodiments of the invention in which an exclusive property or privilege is claimed are defined as follows:

1. In an injection molding machine in which a rigid machine frame supports, among other machine components, a stationary die carrier fixedly mounted on the frame, a movable die carrier arranged for reciprocating opening and closing movements along a central die axis in cooperation with the stationary die carrier, and a die actuating unit connected to both die carriers and imparting to them said reciprocating movements, the combination therewith of a die carrier guiding device comprising:
   a rigid guide frame mounted to the machine in a solidary relationship with respect to the stationary die carrier and extending in the direction of the movable die carrier;
   first guide faces on said guide frame defining a primary guide plane which is parallel to the die axis;
   second oppositely facing guide faces on said guide frame defining two parallel secondary guide planes which are also parallel to the die axis and perpendicular to said primary guide plane;
   first guide means connected to the movable die carrier and engaging said first guide faces for supportive guidance of the movable die carrier thereagainst;
   second guide means connected to the movable die carrier and engaging said second guide faces for clearance-free, non-yielding guidance of the movable die carrier thereagainst; and
   means for transversely fine-adjusting the distance between the second guide means and the second guide faces so as to create a predetermined preload condition therebetween.

2. A die carrier guiding device as defined in claim 1, wherein:
   the guide frame includes two parallel, spaced guide profiles fixedly mounted to it, said first and second guide faces being defined by the two guide profiles; and
   the fine-adjusting means includes means for repositioning at least one of the two guide profiles relative to the other.

3. A die carrier guiding device as defined in claim 1, wherein:

the fine-adjusting means includes threaded spindle means for repositioning the second guide means relative to the second guide faces.

4. A die carrier guiding device as defined in claim 1, wherein:

the first and second guide means comprise a plurality of guide rollers which are journalled on the movable die carrier, the rollers having rolling surfaces engaging said first and second guide faces.

5. A die carrier guiding device as defined in claim 1, wherein:

the first and second guide means comprise two guide rollers which are journalled on the movable die carrier; and each guide roller has a hub and an upstanding flange, the hub having a peripheral surface defining said first guide means engaging one of said first guide faces, and the flange having an axial shoulder surface defining said second guide means engaging one of said second guide faces.

6. A die carrier guiding device as defined in claim 5, wherein:

the two flanged guide rollers have their rotational axis aligned in a plane which is parallel to said primary guide plane;

the peripheral surfaces of the roller hubs are generally cylindrical surfaces; and the axial shoulder surfaces of the roller flanges are generally planar surfaces.

7. A die carrier guiding device as defined in claim 5, wherein:

the journal connection between the guide rollers and the movable die carrier includes anti-friction bearings for the transmission of radial loads and axial loads between said rollers and said die carrier.

8. A die carrier guiding device as defined in claim 7, wherein:

the first and second guide faces are defined by perpendicularly adjacent precision ground faces of two parallel, spaced guide profiles mounted on the guide frame, with said second guide faces located on the inside of the profiles so as to face toward one another; and the journal connection, in conjunction with the fine-adjusting means further includes, for each of the two flanged guide rollers: a bearing pin, a male threaded portion on the pin, a cooperating female threaded member defined by the movable die carrier, and means for securing any adjustment position on said threaded parts.

9. A die carrier guiding device as defined in claim 8, wherein:

said journal connection and fine-adjusting means further include, for each guide roller: an inner bracket and an outer bracket on the movable die carrier accommodating the guide roller between them; a bore extending transversely across the two brackets; a cylindrical shoulder arranged on the inside end of the bearing pin and received within the bore portion in the inner bracket; said female threaded member being a stationary nut received within the bore portion in the outer bracket; and said adjustment position securing means is a clamping plug which radially engages the bearing pin through a radial bore in a wall portion of said nut.

* * * * *